United States Patent Office 3,143,505
Patented Aug. 4, 1964

3,143,505
OIL COMPOSITIONS CONTAINING MIXED METAL SALTS
Arnold J. Morway, Clark, N.J., assignor to Esso Research and Engineering Company, a corporation of Delaware
No Drawing. Filed Apr. 28, 1961, Ser. No. 106,187
7 Claims. (Cl. 252—32.5)

This invention relates to oil compositions containing mixed metal salts of phytic acid and fatty acids. Particularly, the invention relates to lubricating fluids and greases containing alkaline earth metal salts of phytic acid and acetic acid.

Lubricating fluids and greases containing alkaline earth metal salts, particularly calcium salts, of acetic acid and various mixtures or members of $C_6$ to $C_{30}$ fatty acids, have found wide spread use in commercial applications. In general, these mixed salt lubricants have good antiwear and load-carrying properties, which properties have made them commercially successful. However, it has now been found that lubricants of the foregoing type can be further improved by replacing a portion, or all, of the salt of the higher fatty acid with salt of phytic acid. By this substitution, the load-carrying ability of the lubricant can be even further increased. Also, solid grease compositions prepared at high temperatures from the calcium salts of a mixture of acetic acid and the higher fatty acids can be inhibited against crust formation, which previously has been a minor drawback to greases of this type, by the inclusion of calcium salt of phytic acid. Furthermore, the use of phytic acid does impart some oxidation resistance and color retention at elevated temperatures. However, the greatest improvement is obtained by the use of phytic acid salt in the prevention of hardening and crust formation after the grease is subjected to storage at elevated temperatures as may occur in the end caps of bearing assemblies, which end caps are generally packed full of grease. This hardening with prior greases, wherein the thickener is salts prepared only from acetic acid and higher fatty acids, can prevent the proper distribution of a softer lubricant when relubricating the bearing with a grease gun.

Phytic acid is the hexaphosphoric acid ester of inositol. It is a strong acid containing twelve acidic hydrogen groups. Its structural formula is believed to be as follows:

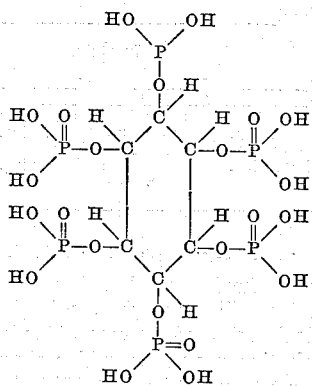

This material, having a molecular weight of 666 with 12 reactive hydrogen groups, has a combining weight (mole equivalent weight) of 55.

Phytic acid is derived from grain, and is a by-product from waste corn steep liquor. A description of phytic acid and its preparation is given in Chemical Engineering, January 27, 1958, under the title "Ion Exchange Now Yields Phytic Acid," published by McGraw-Hill Publishing Co., Inc., New York, New York.

The lubricating compositions of the invention comprise a major amount of the lubricating oil and about 2 to 40, e.g. 5 to 30 wt. percent of the mixed salt-thickener. This thickener in turn, comprises a mixture of the alkaline earth metal salts of acetic acid (or acetic anhydride) and phytic acid. Usually about 0.1 to 25, preferably 0.5 to 15 mole equivalent of acetic acid, per mole equivalent of phytic acid will be used. Optionally, the lubricant can also contain alkaline earth metal salt of $C_7$ to $C_{30}$ fatty acid in an amount of 0.05 to 10.0, preferably 0.1 to 1, mole equivalent proportion of said fatty acid per mole equivalent of phytic acid. Said mole equivalent being based on an equivalent molecular weight of 55 for the phytic acid.

The mixed salt thickener is best prepared by reacting alkaline earth metal base, such as the hydroxides or carbonates of calcium, barium, strontium or magnesium, with the mixture of phytic acid, acetic acid or its anhydride, along with any other fatty acid that is used. Calcium is the preferred metal, being generally used in the form of a lime slurry.

The $C_7$ to $C_{30}$ fatty acids can be considered as two groups, namely intermediate molecular weight fatty acids and high molecular weight fatty acids.

The intermediate molecular weight fatty acids are the $C_7$ to $C_{12}$ acids, and will include those straight or branched chain, saturated and unsaturated acids, such as capric, caprylic, pelargonic acid, lauric acid, etc.

The high molecular weight fatty acids are the $C_{14}$ to $C_{30}$ fatty acids, both saturated and unsaturated, such as stearic, 12-hydroxy stearic, oleic, tallow acids, hydrogenated fish oil acids, etc., or the corresponding glycerides.

If desired, various inorganic acids may be used to replace part (e.g. 50 wt. percent) of the acetic acid component in the preparation of the thickener. Thus, strong mineral acids such as hydrochloric acid, nitric acid, sulfuric acid, orthophosphoric acid and spent acids from sulfonation processes may also be incorporated. Also, dithiodialkyl phosphoric acids wherein the alkyl groups contain 3 to 10 carbon atoms can be used to advantage. An especially preferred inorganic acid is orthophosphoric acid, which is economical, and less corrosive to the manufacturing equipment than acetic acid. Furthermore, by using the phosphoric acid to replace a portion of the acetic acid or its anhydride, the resulting grease is made even more resistant to color and oxidation degradation than if no phosphoric acid was used. Various inorganic metal salts such as alkaline earth metal or alkali metal (e.g. calcium, sodium and lithium) nitrites, phosphates, chromates, carbonates, etc., may be added to the lubricant.

The finished lubricant will include greases, fluids and semi-fluids. To form solid greases, generally 10 to 30 wt. percent of the mixed salt material will be used, while 2 to 10 wt. percent of the mixed salt can be used to form fluid and semi-fluid lubricants. For use as oil well fracturing fluids, large amounts of low grade hydrocarbon oil can be incorporated to give mineral oil compositions containing as little as 0.01 wt. percent, or even less, of the mixed salt material.

Various other additives may also be added to the lubricating composition (e.g. 0.1 to 10.0 weight percent each, based on the total weight of the composition). Such additives include oxidation inhibitors such as phenyl-alpha-naphthylamine, phenothiazine and dioctyldiphenylamine; corrosion inhibitors such as sodium nitrite and sorbitan monooleate; supplemental grease thickeners such as polyethylene and polypropylene; stabilizers such as aluminum hydroxy stearate, and the like.

The compositions of the invention may be prepared in several ways. In one method, all the acids are dispersed in the base oil and neutralized with the metal base. The water of reaction may be left in the lubricant by not applying heat to thereby form a "cold-sett" lubricant. However, generally the product will be heated to about 225° to 600° F. to dehydrate the mixture. If dehydrated at 225° F. to 400° F. the resulting composition will be less thick than if higher dehydration temperatures are used. This relatively low temperature dehydration technique is advantageously used in making semi-fluid or soft greases. If the same composition is heated above 400° F., say about 430° to 600° F., a pronounced thickening effect occurs. This high temperature technique is used to advantage when a more solid or a harder product is desired.

Still another technique forms a solid or harder grease but avoids the high temperatures. This last technique involves partially neutralizing the acids dispersed in oil, i.e. neutralizing only 90 to 98% of the available acidity, heating at 300° to 350° F. for 1 to 8 hours, until the acidity further decreases to about 0.5 to 5.0% (calculated as oleic acid) of the original available acidity, and then adding more metal base sufficient to attain a slight degree of alkalinity.

In each of the above cases involving heating, the mixture may then be next cooled to about 200° to 210° F., where conventional additives, if any, may be added. The grease is then preferably cooled to below 150° F. where it may be homogenized, as by passing through a Gaulin homogenizer or a Charlotte mill, followed by subsequent cooling to room temperature. If desired, grease concentrates can be made by the above techniques and then diluted with additional lubricating oil to form the final grease composition or even further diluted to form a fluid type lubricant.

The invention will be further understood by the following examples, wherein all parts are by weight.

EXAMPLE I-A 9.8 parts of hydrated lime was intimately mixed with 71.2 parts of a mineral lubricating oil having a viscosity of 55 SUS. at 210° F. in a gas heated grease kettle. Then a mixture of 6 parts of glacial acetic acid, 6 parts of phytic acid and 6 parts of Wecoline AAC acid were added to the oil-lime slurry while mixing. Mixing was continued for another half-hour in order to obtain a thorough dispersion. Heating was next applied to raise the temperature to 450° F. Upon reaching this temperature, the heating was discontinued and the kettle contents were cooled rapidly to 200° F. while agitating. 1 part of phenyl α-naphthylamine was then added and the grease was further cooled to 150° F., where it was passed through a Manton-Gaulin homogenizer operating at 5,000 p.s.i.

The Wecoline AAC acid used above was a commercial fatty acid derived from coconut oil and consisting of about 46 wt. percent capric, about 28 wt. percent caprylic and about 26 wt. percent lauric acids.

EXAMPLES I-B, I-C AND I-D

Greases were prepared in a manner similar to that of Example I, but using the raw materials as listed in Table I. The Hydrofol Acid 51 of Table I is a commercial fatty acid mixture which corresponds to stearic acid in average chain length and degree of unsaturation. It is obtained by hydrogenating fish oil acids.

The compositions and the physical properties of the greases of Example I are summarized in Tables I and II which follow:

*Table I*

| Components (parts by weight) | Examples | | | |
| --- | --- | --- | --- | --- |
| | I-A | I-B | I-C | I-D |
| Phytic acid | 6.0 | | 12.0 | 2.0 |
| Glacial acetic acid | 6.0 | 6.0 | 6.0 | 12.0 |
| Wecoline AAC acid | 6.0 | 12.0 | | |
| Hydrofol acid 51 | | | | 4.0 |
| Hydrated lime | 9.8 | 7.8 | 12.5 | 10.0 |
| Phenyl α-naphthylamine | 1.0 | 1.0 | 1.0 | 1.0 |
| Mineral lubricating oil, 55 SUS. visc. at 210° F. | 71.2 | 73.2 | 68.5 | 71.0 |
| Approx. mole equivalent ratio, acetic/phytic* | 1/1 | | 0.5/1 | 6/1 |
| Approx. mole equivalent ratio, higher fatty acid/phytic* | 0.32/1 | | | 0.4/1 |

*Based on a mole equivalent molecular weight of 55 for phytic acid.

*Table II*

| Properties | Examples | | | |
| --- | --- | --- | --- | --- |
| | I-A | I-B | I-C | I-D |
| Percent free alkalinity as NaOH | 0.60 | 0.50 | 0.40 | 0.35 |
| Appearance | Excellent, smooth grease | | | |
| Dropping point, ° F. | 500+ | | | |
| Penetration ASTM 77° F. mm./10: | | | | |
| Unworked | 265 | 340 | 345 | 240 |
| Worked 60 strokes | 290 | 362 | 355 | 290 |
| Worked 10,000 strokes | 310 | 350 | 370 | 305 |
| Shell roller test (4 hrs.—77° F.): | | | | |
| Micro pen. before test | 145 | 169 | | 150 |
| Micro pen. after test | 150 | Semi-fluid | | 140 |
| Percent change | 3.4 | | | −3.3 |
| Wheel bearing test, 1 hour | Pass | Too soft | Too soft to run | Pass |
| tilted. | | | | |
| Norma Hoffmann oxidation, hours to 5 p.s.i. drop | 365 | 185 | 400 | 420 |
| 10,000 r.p.m. spindle test, hours at 250° F.* | 2000+ | | | 2000+ |
| Water solubility | Insoluble | | | |
| Almen test: | | | | |
| Wts. carried, gradual loading | 15 | 6 | 15 | 15 |
| Wts. carried, shock loading | 15 | 3 | 15 | 15 |
| Oven test, 250° F. for 10 days | No crust formation | Crust and hardening | No crust or hardening | No crust or hardening |
| Bearing test, 1 month at 175° F. | No signs of hardening | Hardened when static | No sign of hardening | No sign of hardening |

*ABEC-NLGI spindle test.

As seen by the preceding tables, the use of phytic acid results in greases having good-loading carrying ability, good structural stability and good oxidation resistance. Thus, Example I-A showed a grease of the invention having good lubricating properties, which showed no crust formation after 10 days storage at 250° F., in an oven, and which showed no signs of hardening in the Bearing Test. The Bearing Test was carried out by packing two 204 ball bearings with the lubricant composition and maintaining them for one month at 175° F. One of the bearings was constantly run during this time and the other bearing was not run, i.e. it was static. The composition of Example I-A showed no hardening in either of the two bearings. By contrast, Example I-B, which was a comparison grease in which the phytic acid was replaced by an equal amount of additional Wecoline AAC acid, had poor structural stability towards working, had poor oxidation resistance and had poor load-carrying ability. In addition, the composition of I-B formed crust and hardened in the Oven Test, and in the Bearing Test mentioned above, hardening occurred in the static bearing although no hardening occurrred in the bearing which was run.

Example I-C illustrates a lubricant of the invention made solely from the phytic acid and glacial acetic acid as the sole acid ingredients, which had good extreme pressure properties and did not crust or harden upon storage or use.

Example I-D, which further illustrates the invention, shows a grease prepared from phytic acid, intermediate molecular weight fatty acid and a high molecular weight fatty acid. This grease also showed excellent properties.

In sum Tables I and II illustrate that phytic acid in greases prepared from acetic acid, with or without other fatty acids present, improves the structural stability of the grease, improves the load-carrying ability of the grease, increases the oxidation resistance of the grease and in addition prevents crust formation and hardening, especially at elevated temperatures.

In addition to forming lubricants as noted above, the grease compositions of the invention may be drastically diluted with inexpensive hydrocarbon oil to form fracturing fluids. For example, one part by weight of the grease composition of Example I-A may be diluted by simple mixing with 100 parts by weight of a low grade mineral oil having a viscosity of 80 SUS. at 210° F. This composition can then be used for oil-well fracturing by mixing it in with sand and pumping the resulting mixture under pressure down an oil well to fracture the oil bearing rock. To further illustrate the invention, Example I-A can be exactly repeated, but using no external heating to thereby form a cold-sett grease.

What is claimed is:

1. An oil composition comprising a major amount of lubricating mineral oil and about 2 to 40 wt. percent of a mixed salt thickener comprising coneutralized alkaline earth metal salts of phytic acid and acetic acid in a mole equivalent amount of about 0.1 to 25 moles of said acetic acid per mole equivalent of said phytic acid.

2. An oil composition according to claim 1, wherein said mixed salt thickener also includes alkaline earth metal salt of $C_6$ to $C_{30}$ fatty acid coneutralized with said phytic and acetic acids in an amount of about .05 to 10.0 mole equivalent proportion of said $C_6$ to $C_{30}$ fatty acid per mole equivalent amount of phytic acid.

3. A lubricant comprising a major amount of mineral lubricating oil and about 5 to 30 wt. percent of a mixed salt thickener comprising coneutralized alkaline earth metal salts of phytic acid and acetic acid in a mole equivalent amount of about 0.5 to 15.0 moles of said acetic acid per mole equivalent of said phytic acid.

4. A lubricant according to claim 3, wherein said mixed salt thickener also includes alkaline earth metal salt of a $C_6$ to $C_{30}$ fatty acid in an amount of about 0.1 to 1.0 mole equivalent proportions of said $C_6$ to $C_{30}$ fatty acid per mole equivalent amount of phytic acid, wherein said $C_6$ to $C_{30}$ fatty acid is coneutralized with said phytic and acetic acids.

5. A lubricant according to claim 3, wherein said alkaline earth metal is calcium.

6. A lubricant comprising a major amount of mineral lubricating oil and about 5 to 30 wt. percent of a mixed salt thickener comprising calcium salts of phytic acid, acetic acid, and a $C_7$ to $C_{12}$ fatty acid mixture obtained from coconut oil, in a mole equivalent ratio of about 0.5 to 15 moles of said acetic acid per mole equivalent of said phytic acid, and about 0.1 to 1.0 mole of said $C_7$ to $C_{12}$ fatty acid per mole equivalent of said phytic acid, and wherein all of said acids are coneutralized with lime to form said mixed salt thickener.

7. A method of manufacturing a lubricant comprising a major proportion of mineral lubricating oil and about 2 to 40 wt. percent of alkaline earth metal mixed salts of phytic acid and acetic acid, which comprises neutralizing with alkaline earth metal base in said oil a mixture of about 0.1 to 25 mole equivalent of acetic acid per mole equivalent of said phytic acid, heating the resulting mixture to a temperature of about 225° to 600° F. to dehydrate the mixture, and then cooling to form said lubricant.

References Cited in the file of this patent

UNITED STATES PATENTS

| | | |
|---|---|---|
| 2,871,190 | Finlayson et al. | Jan. 27, 1959 |
| 2,977,303 | Morway et al. | Mar. 28, 1961 |
| 3,001,938 | Morway et al. | Sept. 26, 1961 |